June 29, 1948.  J. H. KING  2,444,049
PRESSURE COMPENSATED SUBMARINE SOUND
TRANSMITTER OR RECEIVER
Filed Jan. 26, 1945  3 Sheets-Sheet 1

INVENTOR
J. H. KING
BY
Walter C. Kiesel
ATTORNEY

June 29, 1948.

J. H. KING 2,444,049

PRESSURE COMPENSATED SUBMARINE SOUND
TRANSMITTER OR RECEIVER

Filed Jan. 26, 1945

INVENTOR
J. H. KING
BY
Walter C. Kiesel
ATTORNEY

Patented June 29, 1948

2,444,049

UNITED STATES PATENT OFFICE 2,444,049

PRESSURE COMPENSATED SUBMARINE SOUND TRANSMITTER OR RECEIVER

John H. King, Chatham, N. J., assignor to Bell Telephone Laboratories, Incorporated, New York, N. Y., a corporation of New York Application January 26, 1945, Serial No. 574,709

5 Claims. (Cl. 177—386)

This invention relates to submarine signaling devices and more particularly to compensating systems, of the general type disclosed in the application Serial No. 521,782, filed February 10, 1944 of Lee G. Bostwick and John H. King, which has matured into Patent No. 2,411,865, Dec. 3, 1946, for maintaining substantial equilibrium between the static pressures upon the opposite faces of the diaphragm in such signaling devices.

One object of this invention is to improve the accuracy of the equilibrium maintained between the pressures on opposite faces of a diaphragm in submarine signaling devices, by pressure compensating systems.

Another object of this invention is to simplify the construction of such compensating systems.

In one illustrative embodiment of this invention, a submarine signaling device comprises a diaphragm having one surface adapted to be exposed to the sea and the opposite surface defining a wall portion of a chamber, a reservoir containing a gas, for example air, under pressure, a valve by way of which the reservoir may be coupled to the chamber, and a control unit for effecting operation of the valve to allow gas from the reservoir into the chamber to compensate for hydrostatic pressures upon the aforenoted one surface of the diaphragm. The valve may be of the solenoid actuated type and the energizing circuit therefor may include a switch actuated by the control unit.

In accordance with one feature of this invention, the control unit comprises a container mounted on the signaling device and having a port in communication with the sea and a second port coupled to the chamber bounded in part by the opposite surface, aforenoted, of the diaphragm, a float within the container, and means for controlling the valve in accordance with the position of the float. In one specific construction, the controlling means comprises a linkage actuated by motion of the float for controlling the switch in the energizing circuit for the solenoid valve.

When the signaling device is submerged in the sea, the pressure upon the outer surface of the diaphragm is dependent upon the depth of submersion of the device and increases as the device is lowered in the sea. As the device is lowered, sea water flows into the container whereupon the float is raised and the valve is operated to permit air from the reservoir to flow into the chamber bounded in part by the inner surface of the diaphragm so that the pressure in this chamber also increases. Inasmuch as the container is coupled to the chamber, as the pressure in the latter increases gas flows into the container and expels the water therefrom until the hydrostatic pressure within the container and, hence, within the chamber, is equal to the hydrostatic pressure at the level to which the signaling device is submerged. When such equality of pressures is established, the float again effects operation of the valve to stop further flow of gas from the reservoir into the chamber so that, as will be apparent, substantial equality obtains between the static pressures on opposite surfaces of the diaphragm.

Any excess pressure within the chamber may be eliminated by way of a relief valve or vent coupling the chamber to the sea.

The invention and the above-noted and other features thereof will be understood more clearly and fully from the following detailed description with reference to the accompanying drawing, in which.

Figure 1:
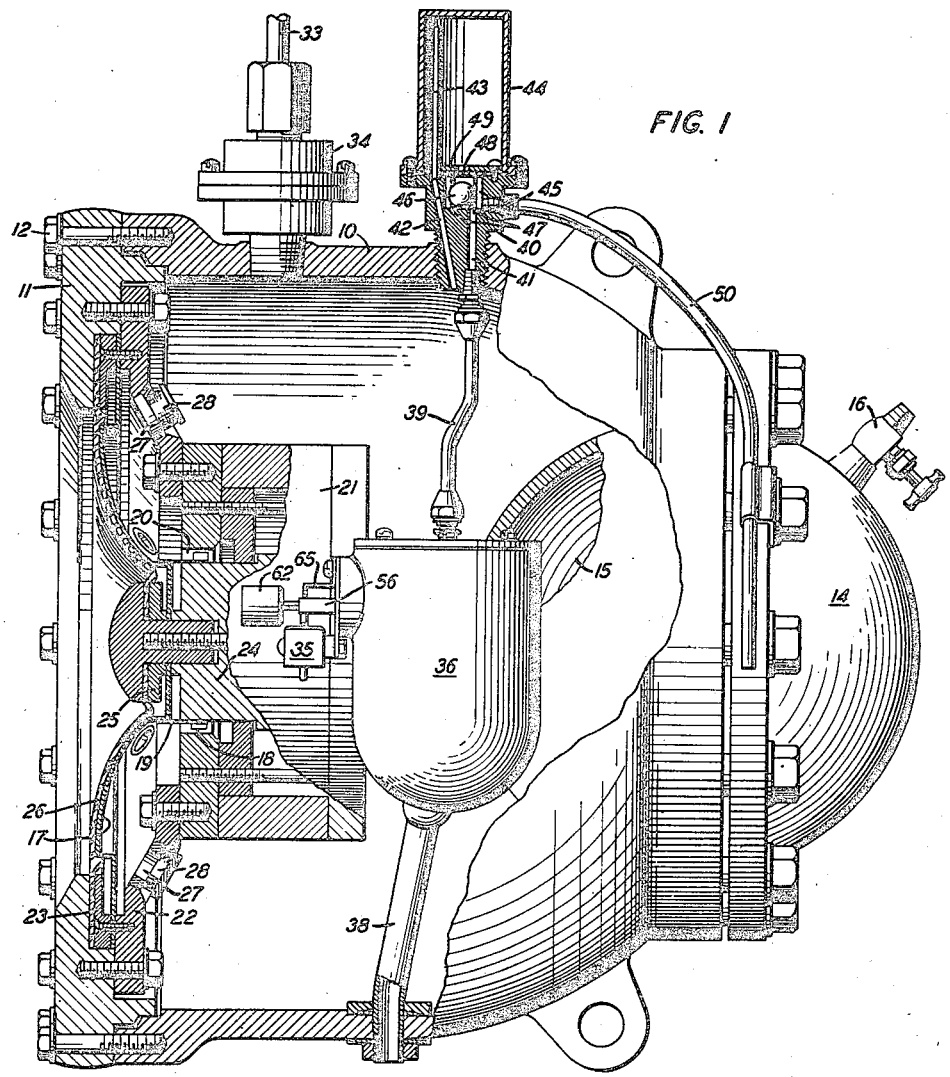
Fig. 1 is a side view, partly in section and partly broken away, of a submarine signaling device illustrative of one embodiment of this invention.

Referring to Fig. 1, the submarine signaling device illustrated therein comprises a generally cylindrical housing 10 having an annular mounting plate 11 affixed to one end thereof, as by screws 12, and having at the other end a substantially hemispherical wall 13 which together with a hemispherical cover member 14 defines a reservoir chamber 15 into which air under pressure may be introduced by way of a valve 16. Supported upon the mounting plate 11 is an electrosonic translating unit, which may be of the moving coil type and of the construction described in detail in the application identified hereinabove.

Briefly the translating unit comprises an annular dished diaphragm 17 to which a signal coil 18 is coupled by a cylindrical mount 19, the coil being disposed in an annular gap 20 in a magnet assembly 21 supported from the the mounting plate 11 by an annular dished member 22. The peripheral portion of the diaphragm 17 is affixed to the member 22 by a clamping ring 23 and the inner edge of the diaphragm is secured to the inner pole 24 of the magnet structure by a clamping member 25. Overlying the diaphragm 17 and intimately affixed to the major portion thereof is a rubber diaphragm 26 which provides a water-tight seal at the clamping member 25 and between the mounting plate 11 and the clamping ring 23. The dished member 22 is provided with a plurality of apertures 27 which may have acoustic resistance elements 28 associated therewith, these elements serving to damp peaks in the response due to resonance of the diaphragm structure.

Figure 2:
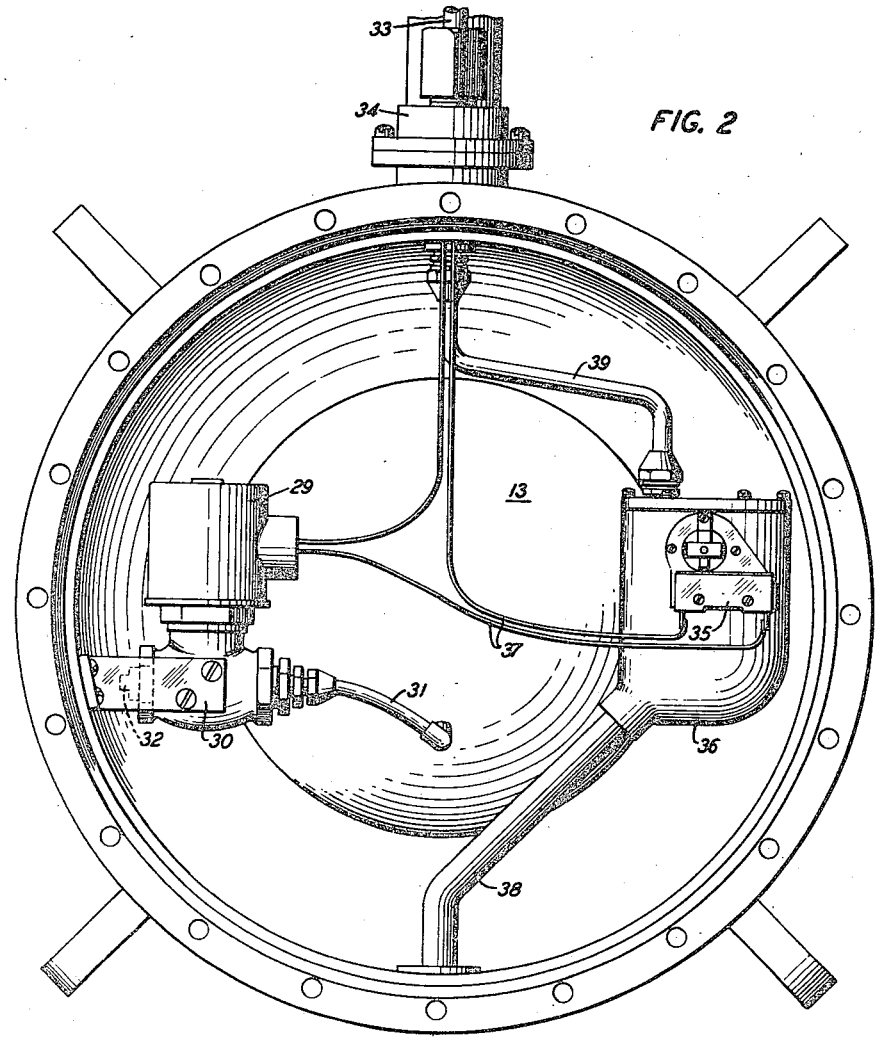
Fig. 2 is a front view of the device shown in Fig. 1 with the cover and translating unit thereof removed.

The reservoir chamber 15 is adapted to be placed in communication with the interior of the housing 10 and, thus, with the inner surface of the diaphragm 17, through the apertures 27, by way of a solenoid operated valve 29 which, as shown in Fig. 2, is supported from the housing 10 as by a bracket 30. The valve 29 has its inlet side connected to the reservoir by a pipe 31 and is provided with an outlet 32. The solenoid for operating the valve is adapted to be energized from a suitable external source over a cable, a portion of which is shown at 33 in Figs. 1 and 2, which enters the housing 10 through a water-tight coupler 34. The energizing circuit for the solenoid includes a microswitch 35 which is mounted upon the container 36 of a control unit and is connected to the solenoid and energizing source (not shown) by conductors 37.

The chamber within container 36 is coupled adjacent its lower end to a port in the housing 10 by a pipe 38 and is adapted to be coupled to the chamber within the housing 10 by way of a second pipe 39 and a relief or vent valve. This valve, as shown clearly in Fig. 1, comprises a plug 40 threaded into the housing 10 and provided with a pair of bores 41 and 42, the bore 41 being in communication with the pipe 39 and the bore 42 being in communication with the interior of the housing 10 and a tube 43 extending into a cover or cap 44 affixed to the plug 40. The plug is provided also with a recess 45 in which a buoyant ball 46 is positioned by a plurality of pins 47 in juxtaposition to the central aperture 48 in a disc 49. The ball 46 and disc 49 in combination define a check valve between the interior of the cap or cover 44 and the exterior, to which the chamber within the cap or cover is coupled by way of the recess 45 and a tail pipe 50. As is apparent, when the device is submerged and the pressure in the interior of the housing 10 exceeds the hydrostatic pressure at the upper end of the tail pipe 50, the ball 46 is maintained out of engagement with the disc 49, so that the interior of the container 36 is in communication with the interior of the housing by way of bores 41 and 42 and the pipe 43 and both are in communication with the sea by way of the tail pipe 50. When, however, the hydrostatic pressure exceeds that within the housing 10, the ball rises and is held in engagement with the disc 49 so that the aperture 48 is closed and the interior of the housing is sealed from the sea.

Figure 3:
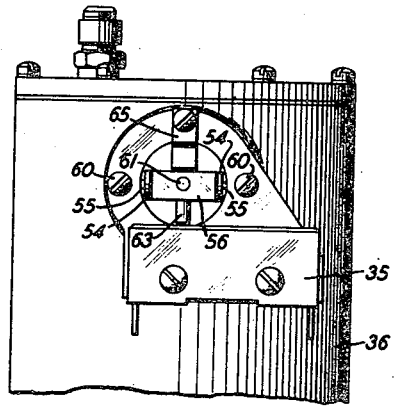
Fig. 3 is a fragmentary view of the control unit showing the switch and the actuating member therefor.
Figure 4:
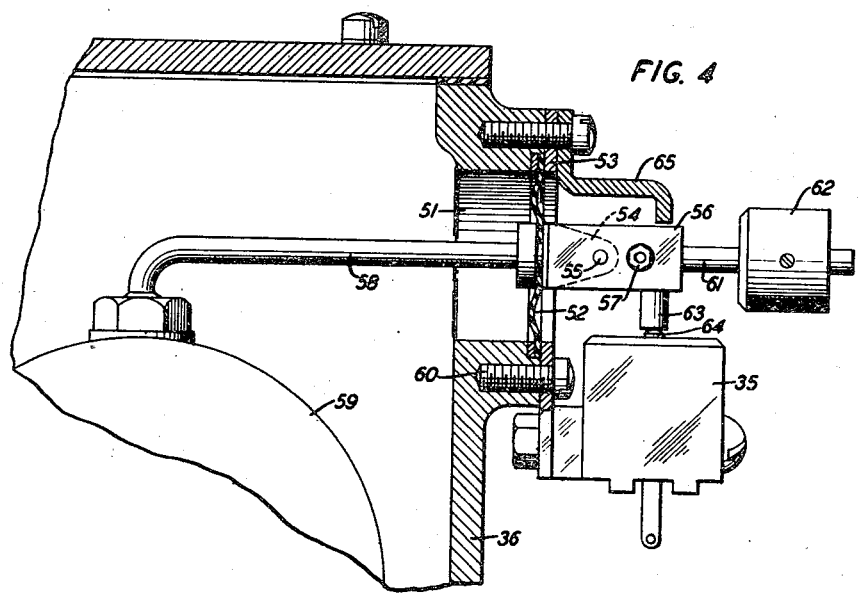
Fig. 4 is a fragmentary detail view to an enlarged scale of a portion of the control unit illustrating details of the linkage between the float and the switch.

As shown clearly in Figs. 3 and 4, the container 36 is provided with an aperture 51 across which a flexible, non-resonant closure or diaphragm 52, for example of rubber, extends. The closure or diaphragm 52 is clamped in place by a support having an annular portion 53 secured to the container 36, as by screws 60, and having also a pair of parallel arms or flanges 54 from which aligned pivot pins or shafts 55 extend. A block or body 56 is supported upon the pins or shafts 55 and mounts a lever which extends therethrough and is locked in position by a screw 57, the lever having a portion 58 extending within the container 36 and carrying a spherical float 59, and having an outwardly extending portion 61 upon which a counterweight 62 is mounted. The block or body 56 has thereon a protuberance 63 for engaging the actuating member or button 64 of the microswitch 35.

Mounted from the container is a stop 65 which serves to limit the extent to which the body 56, and hence the lever, can rock in one direction. The counterweight 62 and float 59 advantageously are correlated so that the lever 58, 61 normally is balanced and the protuberance 63 is disengaged from the actuating button 64 or in light contact therewith. Thus, the switch 35 is in non-operated condition.

When the submarine signaling device is lowered into the sea, the hydrostatic pressure upon the outer surface of the diaphragm 17 increases proportionately to the depth to which the device is submerged. Thus a differential between the static forces acting upon opposite surfaces of the diaphragm is created and the diaphragm tends to be displaced inwardly. However, when the device is lowered into the sea, water flows into the container 36 through the pipe 38 and, as a result, the float 59 is raised whereby the switch 35 is operated to close the energizing circuit for the solenoid of the valve 29. Hence, the valve is operated to allow air under pressure to flow from the reservoir chamber 15 into the interior of the housing 10 by way of the outlet 32 of the valve, whereby the pressure within the housing and, hence, the pressure acting upon the inner face of the diaphragm 17 is increased. Outlet 32 is a restricted orifice to prevent a sudden surge of high pressure air into the chamber and also to limit the volume of air injected, thus conserving the high pressure air supply. As air under pressure flows into the housing, air flows also into the container 36 by way of the bores 41 and 42, and pipes 43 and 39 and tends to expel the water from the container.

When equality is established between the air pressure within the container 36 and the water pressure effective upon the float 59, the lever 58, 61 is returned to its balanced position so that the protuberance 63 is raised and the switch 64 is operated to open the energizing circuit for the solenoid of the valve 29, whereupon the valve closes and the reservoir chamber 15 is disconnected from the interior of the housing 10. As is apparent, when the equality aforenoted is established, a substantial equilibrium exists between the pressures acting upon opposite faces of the diaphragm 17. Any excess pressure within the housing is substantially eliminated by way of the relief valve and the tail pipe 50. Thus, it will be seen that differences between the pressures effective upon opposite surfaces of the diaphragm are eliminated automatically and equilibrium between these pressures is established and maintained.

The complete pressure compensating process occurs in a small fraction of a second and, thus, the device may be lowered into the sea at a moderate rate. When the device is raised from the sea, the hydrostatic pressure on the diaphragm 17 is continuously decreased and the excess internal air pressure on the diaphragm is continuously and automatically relieved through the relief valve and tail pipe 50 as mentioned above.

It will be noted that the float compensator may be adjusted to operate for any desired movement in the depth of submersion of the device, by adjusting the condition of balance of the lever and its deflection requisite for operation of the switch or by an adjustment of the length of the tail pipe. As is obvious, by careful adjustment the compensator may be made sensitive to very small movements of depth. Further, it is to be noted that due to compression of air within the container 36 by water flowing into the container, a high degree of balance is maintained automatically between the water pressure and the air pressure so that accurate compensation for the hydrostatic pressure acting upon the outer face of the diaphragm 17 is realized. In typical devices constructed in accordance with this invention, equality of the pressures upon opposite faces of the diaphragm has been maintained within .02 pound per square inch, corresponding to a water head differential of approximately one-half inch.

Although a specific embodiment of this invention has been shown and described, it will be understood that it is but illustrative and that various modifications may be made therein without departing from the scope and spirit of the invention as defined in the appended claims.

What is claimed is:

1. A submarine signaling device comprising a diaphragm having one face exposed for communication with the sea, means defining a chamber with the other face of said diaphragm, and means for maintaining substantial equilibrium between the static pressures upon said faces of said diaphragm comprising a reservoir containing a gas under pressure, means including a valve for coupling said reservoir to said chamber, means defining a second chamber, means defining a communicating passageway between one point of said second chamber and said first chamber, means defining a passageway for coupling a second point of said second chamber with the medium outside of the device and means for controlling said valve including a lever, a non-resonant mount for said lever and a float member carried by said lever and disposed in said second chamber, said lever with said float member being constructed to be in equilibrium when the pressures at said points are substantially equal.

2. A submarine signaling device comprising a diaphragm having one face exposed for communication with the sea, means defining a chamber with the other face of said diaphragm, and means for maintaining substantial equilibrium between the static pressures upon said faces of said diaphragm comprising a reservoir containing a gas under pressure, means including a valve for coupling said reservoir to said chamber, a container within said chamber and having communication therewith and with the medium outside the device and means including a buoyant member suspended within said container for controlling said valve.

3. A submarine signaling device comprising a diaphragm having one face exposed for communication with the sea, means defining a chamber with the other face of said diaphragm, and means for maintaining substantial equilibrium between the static pressures upon said faces of said diaphragm comprising a reservoir containing a gas under pressure, a solenoid operated valve for coupling said reservoir to said chamber, said valve being normally closed, a container in the device and having communication with the exterior thereof and means including a float member mounted within said container by non-resonant means for operating said solenoid to open said valve when the pressure on said one face of said diaphragm exceeds that upon said other face thereof.

4. A submarine signaling device comprising a diaphragm, a housing defining a chamber with one face of said diaphragm, the other face of said diaphragm being exposed for communication with the sea, a reservoir containing a gas under pressure, means including a valve for coupling said reservoir to said chamber, means for controlling said valve comprising means defining a second chamber in communication with said first chamber, means for coupling said second chamber to the sea, a float within said second chamber and actuating means for said valve controlled by said float to effect opening of said valve only when the hydrostatic pressure within said second chamber exceeds the pressure in said first chamber, and check valve means independent of said float for venting said first chamber when the pressure therein exceeds the hydrostatic pressure on said other face of said diaphragm.

5. A submarine signaling device comprising a diaphragm, a housing defining a chamber with one face of said diaphragm, the other face of said diaphragm being exposed for communication with the sea, and means for maintaining substantial equilibrium between the pressures on said faces of said diaphragm when the device is submerged in the sea, said means comprising a reservoir containing a gas under pressure, means including a solenoid operated valve for coupling said reservoir to said chamber, a switch for controlling operation of said valve, a container defining a second chamber having one end thereof in communication with said first chamber and the exterior of the device and having a port at the other end thereof for communication with only the sea, a float in said second chamber and means actuated by said float for actuating said switch.

JOHN H. KING.

REFERENCES CITED

The following references are of record in the file of this patent:

UNITED STATES PATENTS

| Number | Name | Date |
| --- | --- | --- |
| 952,452 | Leon | Mar. 22, 1910 |
| 1,239,320 | Van Esbroeck | Sept. 4, 1917 |
| 1,318,739 | Fessenden | Oct. 14, 1919 |
| 1,419,596 | Wood | June 13, 1922 |
| 1,443,431 | Palmer | Jan. 30, 1923 |